US011270332B1

(12) United States Patent
Frisbie

(10) Patent No.: US 11,270,332 B1
(45) Date of Patent: Mar. 8, 2022

(54) PROVISIONING OF TEXT MESSAGE WITH UPDATABLE OBJECT

(71) Applicant: Webtxt LLC, North Little Rock, AR (US)

(72) Inventor: Mark Tod Frisbie, Jacksonville, AR (US)

(73) Assignee: Webtxt LLC, North Little Rock, AR (US)

( * ) Notice: Subject to any disclaimer, the term of this patent is extended or adjusted under 35 U.S.C. 154(b) by 0 days.

(21) Appl. No.: 17/216,541

(22) Filed: Mar. 29, 2021

(51) Int. Cl.
  *G06Q 30/02* (2012.01)
  *H04L 51/046* (2022.01)
  *H04L 9/06* (2006.01)

(52) U.S. Cl.
  CPC ..... *G06Q 30/0236* (2013.01); *G06Q 30/0222* (2013.01); *G06Q 30/0224* (2013.01); *G06Q 30/0253* (2013.01); *G06Q 30/0256* (2013.01); *G06Q 30/0267* (2013.01); *H04L 9/0643* (2013.01); *H04L 51/046* (2013.01); *H04L 2209/38* (2013.01)

(58) Field of Classification Search
  CPC .......... G06Q 30/0236; G06Q 30/0222; G06Q 30/0224; G06Q 30/0253; G06Q 30/0256; G06Q 30/0267; H04L 9/0643
  See application file for complete search history.

(56) References Cited

U.S. PATENT DOCUMENTS

| 10,438,214 | B1 * | 10/2019 | Kim ........................ G06Q 30/02 |
| 2014/0278880 | A1 * | 9/2014 | Lemphers .......... G06Q 30/0222 705/14.26 |
| 2014/0372867 | A1 * | 12/2014 | Tidhar .................. G06F 40/174 715/234 |
| 2015/0088607 | A1 * | 3/2015 | Georgoff .............. G06Q 10/107 705/7.31 |
| 2016/0012465 | A1 * | 1/2016 | Sharp ................... G06Q 20/386 705/14.17 |
| 2018/0034755 | A1 * | 2/2018 | Saoji .................. G06Q 30/0261 |
| 2020/0210978 | A1 * | 7/2020 | Brown .................. H04L 9/3239 |

* cited by examiner

*Primary Examiner* — Scott C Anderson
(74) *Attorney, Agent, or Firm* — Michael D. Eisenberg

(57) ABSTRACT

An example system may include a processor and memory of an ad processing server, wherein the processor is configured to perform one or more of receive a product-related keyword associated with a category from the at least one mobile node; retrieve matched data linked with discount coupons data from a data source based on the product-related keyword and the category; send a text message comprising an embedded object associated with the matched data to the at least one mobile node; and responsive to a receipt of selected discount coupon data from the least one mobile node, execute a redeem code associated with a selected discount coupon data keyword.

22 Claims, 7 Drawing Sheets

PROVISIONING OF TEXT MESSAGE WITH UPDATABLE OBJECT

TECHNICAL FIELD

This application generally relates to a text messaging system, and more particularly, to provisioning of text messages with an updatable imbedded object.

BACKGROUND

Service providers use text advertisement campaigns to broadcast texts with coupons (or discount offers) to mobile devices of potential consumers. Typically, the service provider generates an object such as a coupon that is inserted into the text of the mobile advertisement. A redeem code for the coupon is also inserted into the body of the text message. The service provider also generates a redeem text message (e.g., "Thank you. This coupon is redeemed!"). The service provider may generate a unique QR code for each of the text ads. Thus, the new textual ads with coupons and redeem codes have to be created for each text campaign.

Conventional text marketing applications utilize a keyword to trigger an auto response that returns a text message with a discount or offer coupon. This process always requires a change or an update of keywords to match the offers. For example, a text "coffee" to Phone #555-121-1212 may correspond to a "coffee" discount or offer, so the keyword has to be changed to match a new offer defined by a different Keyword. Texting keywords do not identify a business or company that provides a service or product (e.g., coffee). The keywords only identify an offer or a discount. Therefore, the keywords cannot be used for searches by any search engine optimization (SEO) algorithms. Thus, the keywords searches may only result in a handful of product/ service providers that list "texting" and "coffee" in their SEO profile. The search results do not display the offer or the individual keyword and phone number to retrieve this discount. This makes the entire process extremely complicated by having to open every business web site and then digging around to find their texting program the customer may have to join first. Then after the consumers join the texting platform, they have to wait to receive another text from the platform with the discount or offer coupon. This always places the consumers in a situation when they subjected to text blasts to receive product or service discounts or coupons that the consumer does not wants most of the time. This may lead to consumers opting out of all text marketing platforms. At the same time 90% of consumers may directly join a texting platform to receive an instant discount or offer coupon and then after selecting a product or service from a particular business may opt out.

Additionally, a mobile device user who receives the text ad has to manually enter a phone number and a product/ service keyword and a redeem code in order to process a discount coupon. This is inconvenient and costly as each advertisement comparing requires processing resources of the service provider who has to communicate with a text marketing service for each of the advertisement campaigns. Conventional text advertisement campaigns use centralized databases for matching mobile customers with ads containing coupons.

However, a centralized database suffers from significant drawbacks. For example, a centralized database has a single point of failure. In particular, if there are no fault-tolerance considerations and a hardware failure occur (for example, the hardware, a firmware, and/or a software failure), all mobile user data within the database is lost. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage. Conventionally, a centralized database is limited by low search capability, lack of security and slow speed of transactions. As such, what is needed is a blockchain-based solution for matching the textual ads with mobile users.

Accordingly, a system and method that allow service providers to make discounts available to mobile users without having to text blast their database continually to user mobile devices and to match textual ads with mobile user profiles from a blockchain are desired.

SUMMARY

One example embodiment provides a processor and memory of an ad processing server, wherein the processor is configured to receive a product-related keyword that is stored inside a designated category from the at least one mobile node, retrieve matched data linked with discount coupons data from a data source based on the product-related keyword/category, send a text message comprising an embedded object associated with the matched data to the at least one mobile node; and responsive to a receipt of selected discount coupon data from the least one mobile node, execute a redeem code associated with the selected discount coupon data keyword.

Another example embodiment provides a method that includes one or more of receiving, by an ad processing server, a product-related keyword that is stored inside a designated category from the at least one mobile node, retrieving, by the ad processing server, matched data linked with discount coupons data from a data source based on the product-related keyword/category, sending, by the ad processing server, a text message comprising an embedded object associated with the matched data to the at least one mobile node, and responsive to a receipt of selected discount coupon data from the least one mobile node, executing a redeem code associated with the selected discount coupon data keyword attached to the text message and not to the embedded object.

A further example embodiment provides a non-transitory computer readable medium comprising instructions, that when read by a processor, cause the processor to perform one or more of receiving a product-related keyword/category from the at least one mobile node, retrieving matched data linked with discount coupons data from a data source based on the product-related keyword/category, sending a text message comprising an embedded object associated with the matched data to the at least one mobile node, and responsive to a receipt of selected discount coupon data from the least one mobile node, executing a redeem code associated with the selected discount coupon data keyword attached to the text message and not the embedded object.

DETAILED DESCRIPTION

Figure 1A:
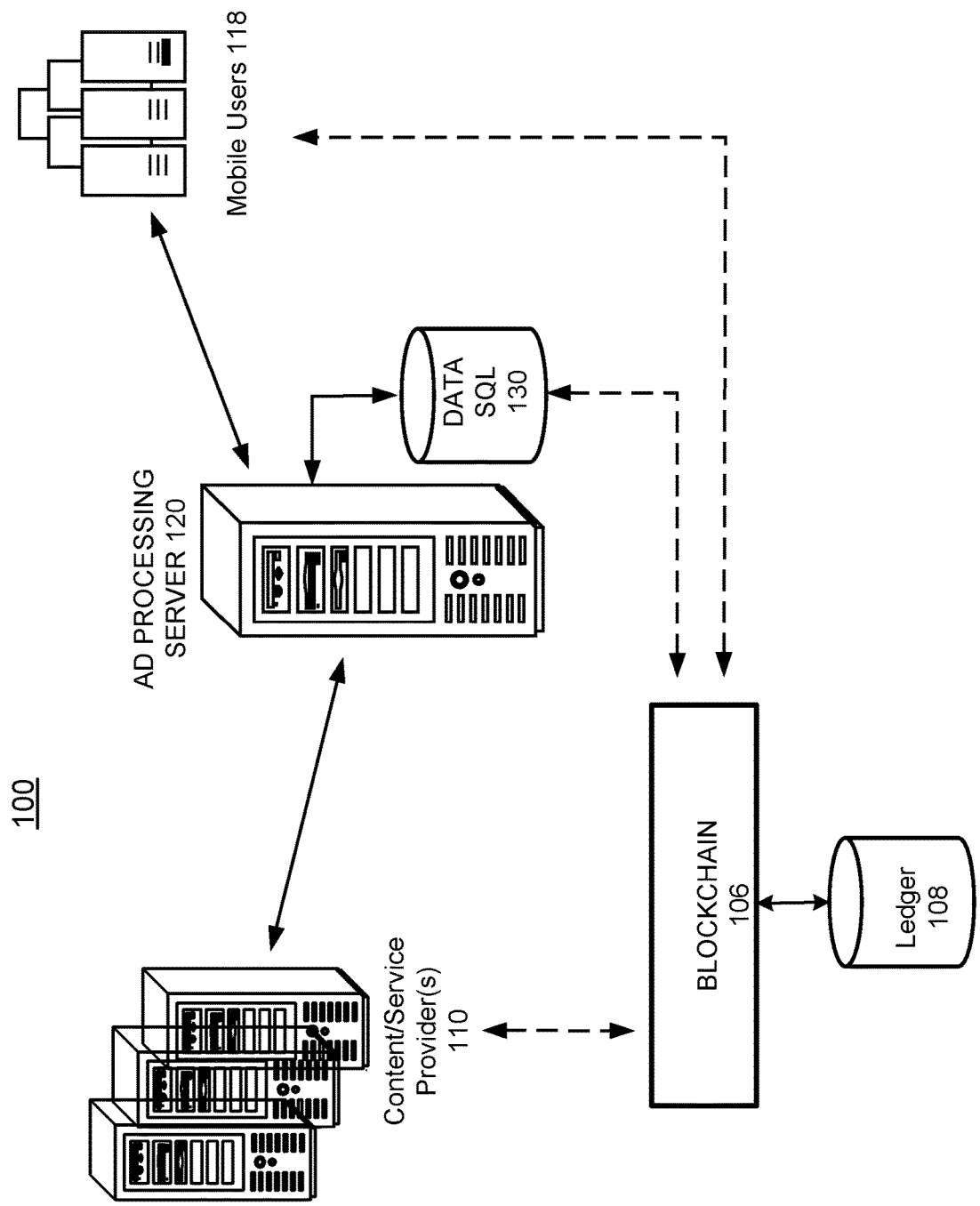
FIG. 1A illustrates a network diagram of a system including a ledger database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide for provisioning of text messages with an updatable imbedded object.

The exemplary embodiment may use a blockchain technology for improved storage and security. A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native crypto-currency and use consensus based on various protocols such as Proof of Work (PoW). On the other hand, a permissioned blockchain database provides a system which can secure interactions among a group of entities which share a common goal, but which do not fully trust one another, such as businesses that exchange funds, goods, information, and the like.

Some benefits of the instant solutions described and depicted herein include a method and system for provisioning of text messages with an updatable imbedded object using a blockchain network. The exemplary embodiments may solve the issues of time and trust by extending features of a database such as immutability, digital signatures and being a single source of truth. The exemplary embodiments provide a solution for a textual ad generation and shared distribution in blockchain-based network. The blockchain networks may be homogenous based on the asset type and rules that govern the assets based on the smart contracts.

One of the benefits of the example embodiments is that it improves the functionality of a computing system/server by implementing a method for provisioning of text messages with an updatable imbedded object through blockchain-based systems. Through the blockchain system described herein, a computing system/server can perform functionality for a provisioning of text messages with an updatable imbedded object in blockchain networks by providing access to capabilities such as distributed ledger, peers, encryption technologies, event handling, etc.

Accordingly, the exemplary embodiments provide for a specific solution to a problem in the arts/field of provisioning of textual ad messages with an updatable imbedded object on a distributed network including a cellular network and a blockchain network.

According to the exemplary embodiments, a method, system and a computer readable medium for provisioning of text messages with an updatable imbedded object. The exemplary embodiments may, advantageously, allow service providers to make discounts available to mobile users without having to text blast their database continually to user mobile devices during an advertisement campaign. In one embodiment, a cloud server system may match textual ads with mobile user profiles from a blockchain ledger.

The solution described herein allows a location-based service provider (e.g., a retail business) to display instant ads to mobile device (e.g., a smart phone, a tablet, a smart watch) users to receive text messaging offering discounts. In one embodiment, an ad processing server, such as a cloud server, may provide an interface to allow mobile consumers to join a network for future direct text marketing. The ad processing server may execute a logic that provides a custom updatable object such as URL to be embedded into a text message provided to a mobile user cell phone. Once the mobile user receives the text with the embedded URL, the controls may be automatically added to the text message that is embedded into the URL. For example, a "Redeem"

button for redeeming coupons, a "Reply" button, a "Share" button for sharing the coupons with other users, and a "GO" button may provided via a mobile device interface. This allows a service provider (i.e., a business) to communicate directly with the consumers within an access range in real time with no middle man or an intermediate marketing entity. An interface invoked on the user mobile device may allow the user to press one button to receive the text coupon when looking to engage in transactions with the local service provider. At the same time, the exemplary embodiments, advantageously, allow a business to make discounts available to the customers without having to text blast their coupon database continually.

In one embodiment, the ad processing server may execute an SMS Text Engine logic configured to store content from providers that matches a keyword and phone number or a short code received from a mobile user. The SMS Text Engine logic may store auto response SMS messages with pre-set URL links and hidden coupon redeem code used to recognize each URL and the consumer's phone number. The unique redeem code enables all coupons to be redeemed for a single use only. According to the exemplary embodiment, the SMS Text Engine logic is configured to pre-set a number of URLs that match content from a database or from a blockchain ledger. Content may be determined by Find Engine logic and may be embedded into a second URL. Thus, multiple uses within an access range may employ a single URL. While the content provided by the Find Engine logic may change accordingly to the category defined by a keyword (or a set of key words) and a distance to a service provider, the URL may remain the same. The Find Engine logic may deliver content inside the single URL referencing a number of different content providers via control button links.

For example, a mobile device user (i.e., a consumer) may select "coffee" and "5 miles range" from the service provider from his mobile device screen displaying an interface associated with the ad processing server. Then, the mobile device user may click on a "Get Text" button, and the data reflecting his selection (i.e., "coffee within the five miles range") is captured and processed through a Want Engine logic which collects all available coffee listings—i.e., (Starbucks, Dunkin Donuts, *Nexus*, etc.) collated from the Category "coffee." Then, the Want Engine logic calculates the distance and renders all of the matched data. The matched data is then sent to the Find Engine logic that compares the matched data against the stored encrypted data of the mobile user's past interactions. In one embodiment, the data may be compared to transaction log data stored on a blockchain ledger. This allows the Find Engine logic to collate matched listings based on the clients past desires and actions. In one embodiment, the ad processing server may render only the discounts with the active "Get Tex" button beside each discount to the mobile user. Thus, a single URL may reference a list of discounts from many different providers of coffee with their active "Get Text" button within a desired access range. Then, the mobile device user can choose which discounts he or she prefers.

According to the exemplary embodiment, content provider entities may establish an account that may create a URL defined by "Category" that is able to display content of discounts with the active "Get Text" button. The "Get Text" button is pre-configured with a keyword (or a set of words) and Phone # or a short code. When the mobile user clicks the "Get Text" button, the mobile device sends an SMS with "Keyword" to the Phone #. Then, the Text Engine logic running on the ad processing server returns an SMS message with the URLs referencing the discounts for products defined by the keyword, i.e. ("Starbucks" keyword is Star001). The URLs will always be the same. The data referenced by the URLs may be pulled from the database residing on the ad processing server (that can be a cloud server) or the database may be distributed on a cloud. As discussed above, the data may be retrieved from a blockchain ledger.

According to one embodiment, the interface of the mobile device may display control buttons associated with each of these URLs to a user. Pressing of a control button may instantiate the hidden redeem code to capture and store matched data so each link can only be redeemed once per click of the "Get Text" button. While the URL link can be shared many times, the unique redeem code is embedded in the text code. So each time the "Redeem" button is pressed, it invokes the Text Engine logic to verify that the coupon-related data matches the mobile user phone number, time, date and the discount that is connected to the Keyword. Then, the SMS Text Engine logic will return another text indicating that the coupon is good or has already been redeemed. Subsequently, the content/service provider can change the discount value in the ad processing server database (or on the blockchain ledger) as often as desired. The keyword and the short code will always remain the same, while the content referenced by the URLs may be updated to reflect new discount coupons. The URL may have a current date included with it so the customers can be assured that the discounts associated with the URL are current. In one embodiment, the text message with the URL may display a "Share" button. Once this button is pressed, all of the contacts of the mobile device may be selected and sent a text message with the URL.

According to the exemplary embodiments, a keyword and a phone number may be affixed or assigned to an individual product/service provider that is placed inside a category such as, for example, "coffee." Then, when a mobile user searches for "coffee," text discounts related to all providers that are listed in the "coffee" category may be displayed. For example, 25 different product providers all with different keywords and phone numbers may be found by the search and may be displayed with the "GET Text Button" that directly allows the consumer to retrieve the offers or discounts coupons they choose. This novel approach can now allow all businesses in the category to offer any product or discount while keeping the consumer aware of what category he/she has selected. For example, a consumer searches for "coffee Text discounts." This search may locate all businesses within an access range listed in the "coffee" category and may display their "Get Text discount" button with description of the discount or offer coupon. For example, if the product provider is a coffee company (e.g., Starbucks™), a dedicated "GET Text" button may list a free Danish, or smoothie, or sandwich as the discount or offer. This, advantageously, allows product providers to change, update their text discounts or offers in real time without altering their keywords or phone number. This process will always maintain SEO compatibility.

FIG. 1A illustrates a network diagram of a system 100 including a blockchain ledger database, according to example embodiments.

Referring to FIG. 1A, an ad processing server 120 may be connected to a service provider node(s) 110 over a network. In one embodiment, the ad processing server 120 may be connected to the service provider node(s) 110 over a blockchain 106 network. The ad processing server 120 may be connected to mobile users 118 over a wireless network. In one embodiment, the ad processing server 120 may execute an SMS Text Engine logic configured to store content from the service provider node(s) 110 that matches a keyword/category and phone number or a short code received from a mobile user 118. The SMS Text Engine logic may store auto response SMS messages with pre-set URL links and hidden coupon redeem code used to recognize each URL and the mobile user's 118 phone number. The unique redeem code enables all coupons to be redeemed for single use only. According to the exemplary embodiment, the SMS Text Engine logic is configured to pre-set a number of URLs that match content from a database 130 or from a blockchain ledger 108. Content may be determined by Find Engine logic and may be embedded into a second URL. Thus, multiple mobile users 118 within an access range may employ a single URL. While the content provided by the Find Engine logic may change accordingly to the category defined by a keyword (or a set of key words) and distance to the service provider 110, the URL may remain the same. The Find Engine logic may deliver content inside the single URL referencing a number of different content providers 110 via control button links.

As discussed in the above example, a mobile device user (i.e., a consumer) 118 may select "coffee" and "5 miles range" from the service provider 110 from his mobile device screen displaying an interface associated with the ad processing server 120. Then, the mobile device user 118 may click on a "Get Text" button, and the data reflecting his selection (i.e., "coffee within the file miles range") is captured and processed through a Want Engine logic which collects all available coffee listings, i.e. (Starbucks, Dunkin Donuts, Nexus, etc.) found in the "coffee" category and calculates the distance and renders all of the matched data. The matched data is then sent to the Find Engine logic that compares the matched data against the stored encrypted data of the mobile user's past interactions. In one embodiment, the data may be compared to transaction log data stored on a blockchain ledger 108. This allows the Find Engine logic to collate matched listings in that category based on the clients past desires and actions. In one embodiment, the ad processing server 120 may render only the discounts with the active "Get Tex" button beside each discount to the mobile user 118. Thus, a single URL may reference a list of discounts from many different providers in category "coffee" with their active "Get Text" button within a desired access range. Then, the mobile device user 118 can choose which discounts he or she prefers.

According to the exemplary embodiment, content/service providers 110 may establish an account that may create a URL defined by the category that is able to display content of discounts with the active "Get Text" button to a mobile user 118. The "Get Text" button is pre-configured with a keyword (or a set of words) and a Phone number or short code and mobile user 118 phone number. When the mobile user 118 clicks the "Get Text" button, the mobile device sends an SMS with the Keyword to the Phone number to the Text Engine logic running on the ad processing server 120 that returns an SMS message with the URLs referencing the discounts for products defined by the keyword and the category. The data referenced by the URLs may be pulled from the database 130 residing on the ad processing server (that can be a cloud server) or the database 130 may be distributed on a cloud. As discussed above, the data may be retrieved from a blockchain ledger 108.

According to one embodiment, the interface of the mobile device may display control buttons associated and embedded in each of these URLs to a user. Pressing of a control button may instantiate the hidden redeem code to capture and store matched data so each link can only be redeemed once per click of the "Get Text" button. While the URL link can be shared many times, the unique redeem code is embedded in the text code. So each time the "Redeem" button is pressed, it invokes the Text Engine logic to verify that the coupon-related data matches the mobile user phone number, time, date and the discount. Then, the SMS Text Engine logic will return another text indicating that the coupon is good or has already been redeemed. Subsequently, the content/service provider 110 can change the discount value in the ad processing server database 130 (or on the blockchain ledger 108) as often as desired. The keyword and the short code will always remain the same, while the content referenced by the URLs may be updated to reflect new discount coupons. The URL may have a current date included with it so the customers can be assured that the discounts associated with the URL are current. In one embodiment, the text message with the URL may display a "Share" button. Once this button is pressed, all/any of the contacts of the mobile device may be selected and sent a text message with the URL.

In one embodiment, a product-related keyword received from a mobile user 118 may be converted into a category. This allows for the keywords to be permanently assigned or affix to a business based on the category. Permanently assigning or affixing the keywords inside searchable SEO compatible categories allows the content providers to display Keywords and discounts or offers via updateable object embedded into a text message URL link. The URL link may be configured to execute a text marketing process—i.e., activate control buttons "Get Text," "Share" button, "Redeem" button, "Reply" button and "Go" button. This works in perfect harmony with cellular hardware functionality to perform all aspect of SMS marketing campaigns.

In one embodiment, a blockchain 106 consensus mechanism may be used for redeeming the discount coupons. For example, a consensus between several service providers 110 may be reached prior to providing a discount to a mobile device user 118. Using the example discussed above, the content/service provider 110 may not be able to provide a discount on coffee below a certain value because of not getting an agreement form other service providers 110 in the given area (e.g., five miles range).

Figure 1B:
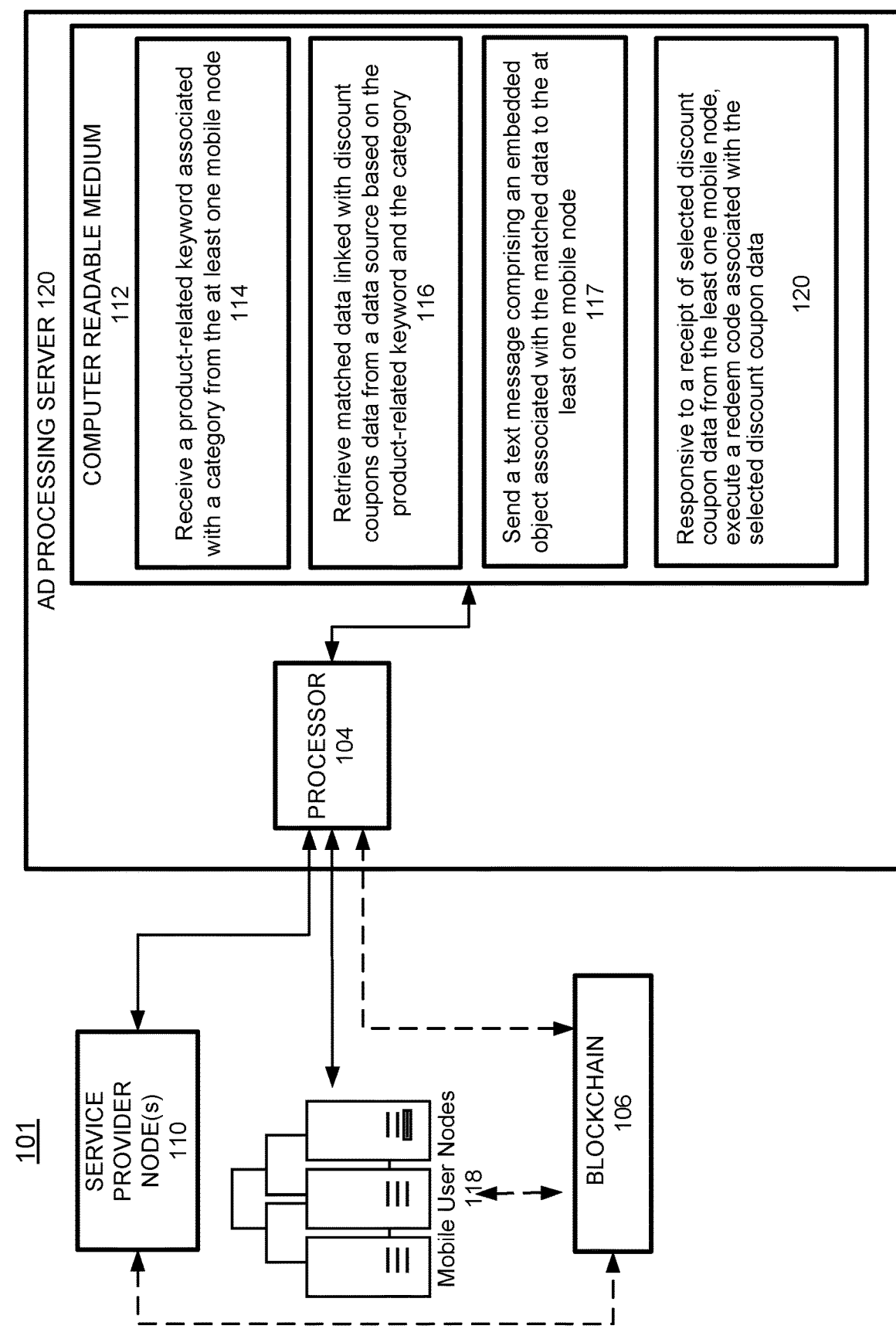
FIG. 1B illustrates a network diagram of a system including detailed features of an ad processing server node, according to example embodiments

FIG. 1B illustrates a network diagram 101 of a system including detailed features of an ad processing server node, according to example embodiments.

In one embodiment, a blockchain 106 consensus mechanism may be used for redeeming the discount coupons. For example, a consensus between several service providers 110 may be reached prior to providing a discount to a mobile device user 118. Using the example discussed above, the content/service provider 110 may not be able to provide a discount on coffee below a certain value because of not getting an agreement form other service providers 110 in the given area (e.g., five miles range).

FIG. 1B illustrates a network diagram 101 of a system including detailed features of an ad processing server node, according to example embodiments.

Referring to FIG. 1B, the example network 101 includes the ad processing server 120 connected to a service provider node(s) 110 over a network. In one embodiment, the ad processing server 120 may be connected to the service provider node(s) 110 over a blockchain 106 network. The ad processing server 120 may be connected to mobile users 118 over a wireless network. Multiple other participant nodes may be connected to the ad processing server 120. While this example describes in detail only one ad processing server 120, multiple such nodes may be connected to the blockchain 106. It should be understood that the ad processing server 120 may include additional components and that some of the components described herein may be removed and/or modified without departing from a scope of the ad processing server 120 disclosed herein. The ad processing server 120 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the ad processing server 120 may include multiple processors, multiple cores, or the like, without departing from the scope of the ad processing server 120 system.

The ad processing server 120 may also include a non-transitory computer readable medium 112 that may have stored thereon machine-readable instructions executable by the processor 104. Examples of the machine-readable instructions are shown as 114-120 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may fetch, decode, and execute the machine-readable instructions 114 to receive a product-related keyword associated with a category from the at least one mobile user node 118. Categories may be predefined for given sets of keywords. The blockchain 106 network may be configured to use one or more smart contracts that manage transactions for multiple participating nodes (110, 118, 120, etc.).

The processor 104 may fetch, decode, and execute the machine-readable instructions 116 to retrieve matched data linked with discount coupons data from a data source based on the product-related keyword and the category. The processor 104 may fetch, decode, and execute the machine-readable instructions 117 to send a text message comprising an embedded object associated with the matched data to the at least one mobile user node 118. The processor 104 may fetch, decode, and execute the machine-readable instructions 120 to, responsive to a receipt of selected discount coupon data from the least one mobile user node 118, execute a redeem code associated with a selected discount coupon data keyword.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

Figure 2:
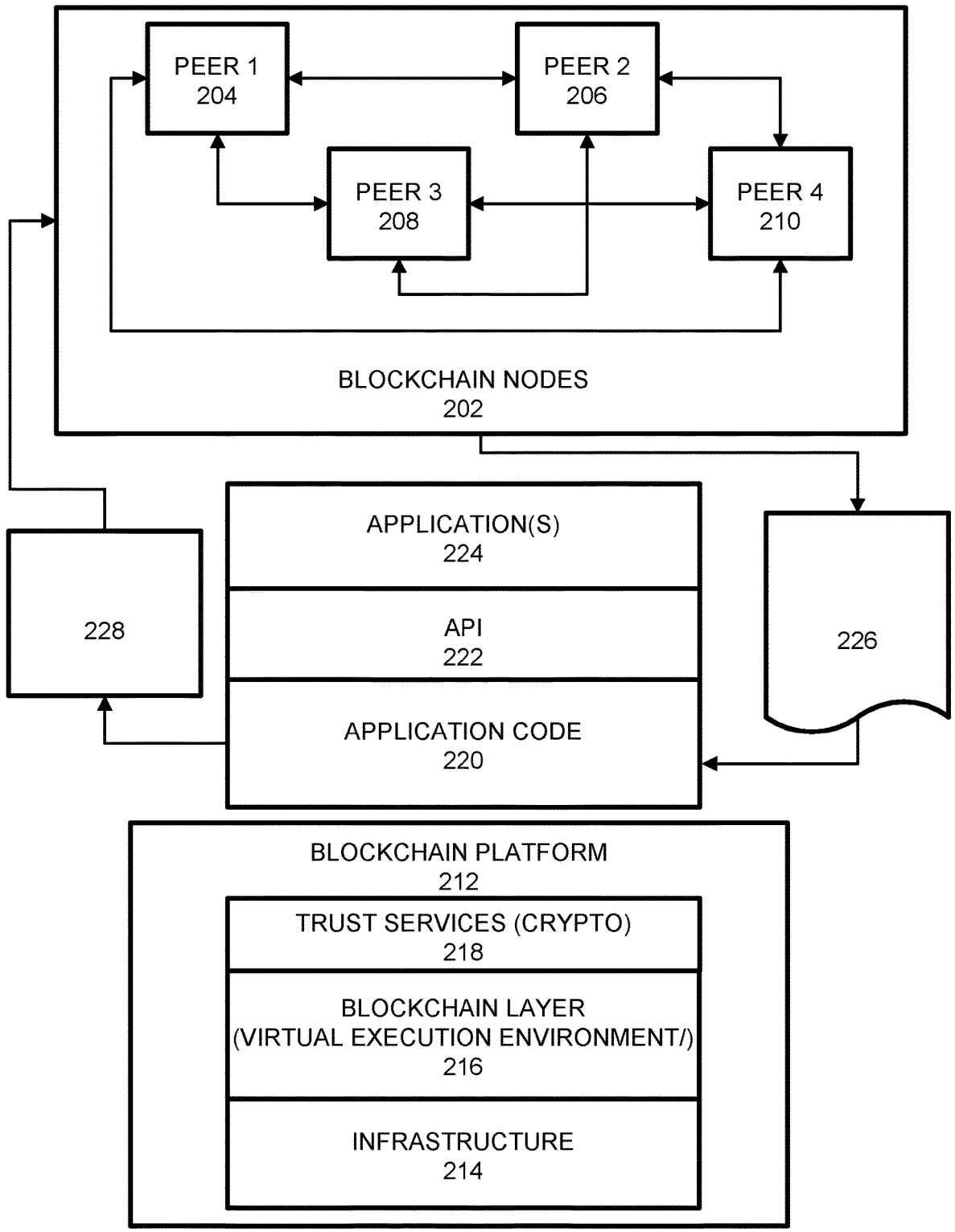
FIG. 2 illustrates an example peer node configuration, according to example embodiments.

The blockchain architecture configuration of FIG. 2 may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the secret share information 226 may be processed by one or more processing entities (e.g., virtual machines) included in the blockchain layer 216. The result 228 may include data blocks reflecting a share of the generated secret. The physical infrastructure 214 may be utilized to retrieve any of the data or information described herein.

Within a chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment and then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2, secret generation may include execution of the smart contract. One function may be to commit a transaction related to execution of the smart contract on the ledger for recording the shares of the secret, which may be provided to one or more of the nodes 204-210. Blockchains require decentralized key generation—i.e., a key-generation process, where multiple non-mutually trusted participants offer their shares (i.e., advantageously contribute randomness). As a result, each participant may obtain a share of the generated key, and all participants together may obtain a single public key for the system.

Figure 3:
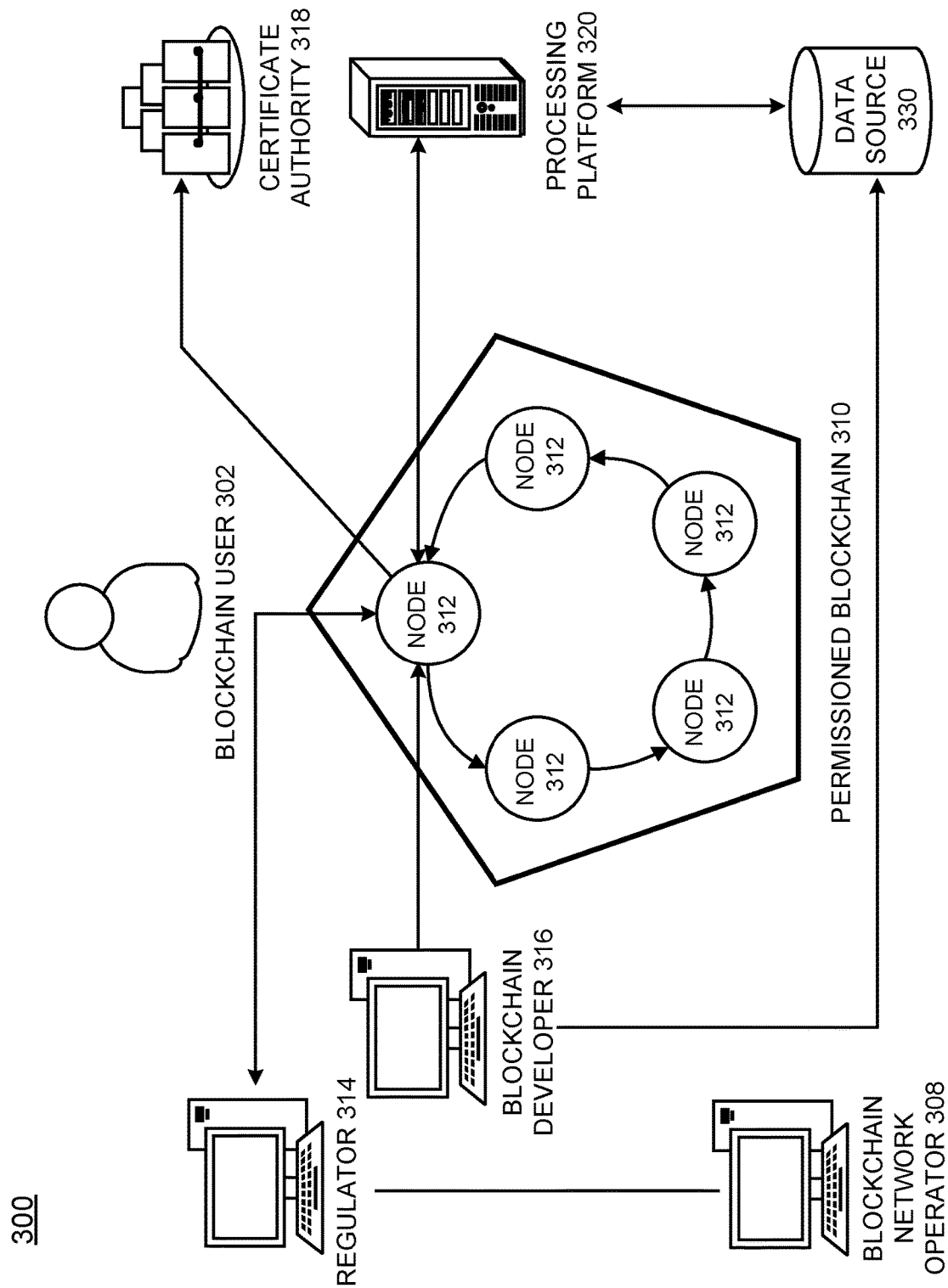
FIG. 3 illustrates a blockchain network, according to example embodiments.

FIG. 3 illustrates an example of a blockchain network 300, which features a distributed, decentralized peer-to-peer architecture, and a certificate authority 318 managing user roles and permissions. In this example, a blockchain user 302 may submit a transaction to the permissioned blockchain network 310. In this example, the transaction can be deploy, invoke or query, and may be issued through a client-side application leveraging an SDK, directly through a REST API, or the like. Trusted business networks may provide access to regulator systems 314, such as auditors. Meanwhile, a blockchain network operator system of nodes 308 manages member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a an interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
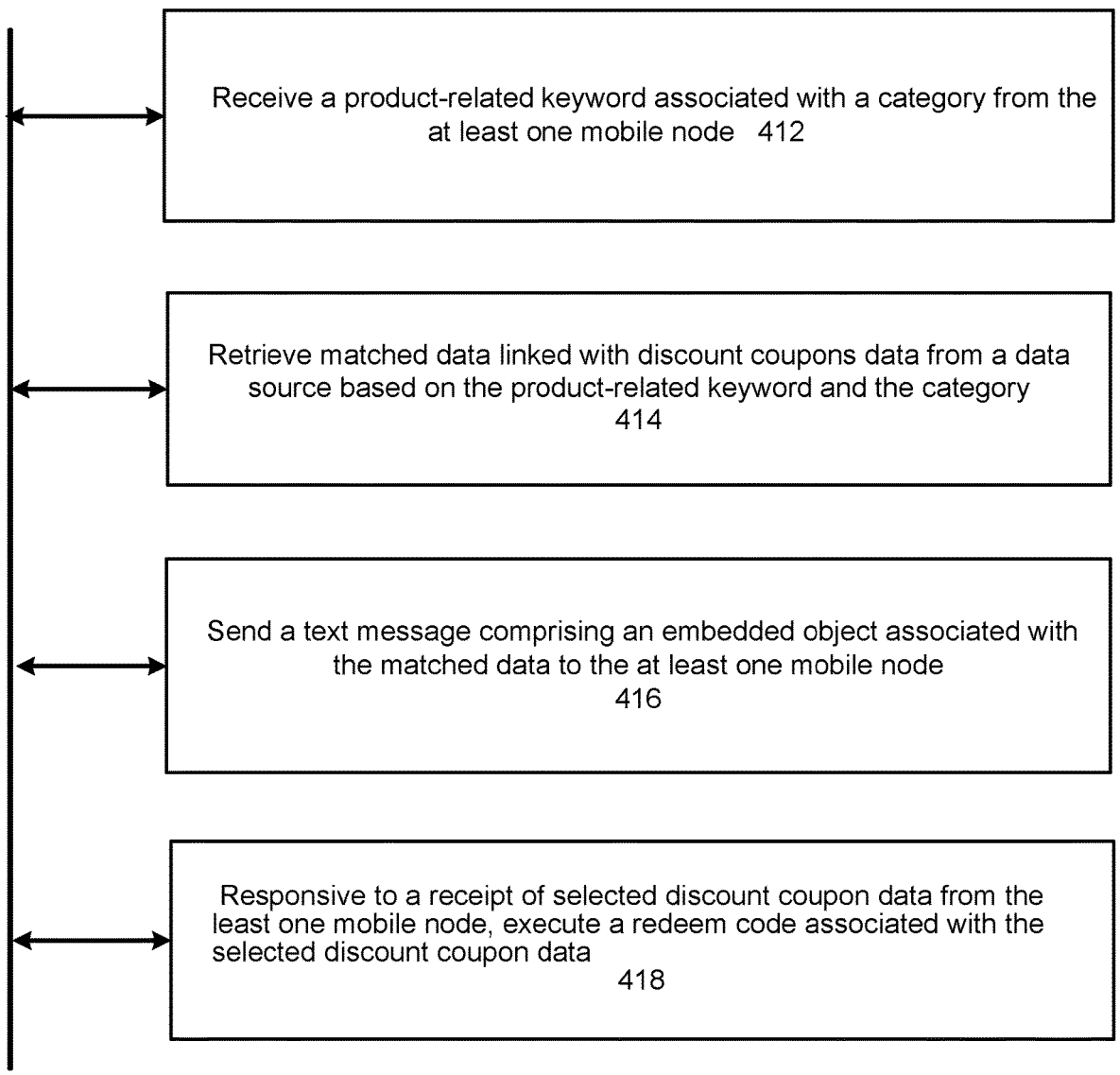
FIG. 4A illustrates a flow diagram, according to example embodiments.

FIG. 4A illustrates a flow diagram 400 of an example method of provisioning of text messages with an updatable imbedded object, according to example embodiments. Referring to FIG. 4A, the method 400 may include one or more of the steps described below.

FIG. 4A illustrates a flow chart of an example method executed by the ad processing server 120 (see FIG. 1B). It should be understood that method 400 depicted in FIG. 4A may include additional operations and that some of the operations described therein may be removed and/or modified without departing from the scope of the method 400. The description of the method 400 is also made with reference to the features depicted in FIG. 1B for purposes of illustration. Particularly, the processor 104 of the ad processing server 120 may execute some or all of the operations included in the method 400.

With reference to FIG. 4A, at block 412, the processor 104 may receive a product-related keyword associated with a category from the at least one mobile node. At block 414, the processor 104 may retrieve matched data linked with discount coupons data from a data source based on the product-related keyword and the category. At block 416, the processor 104 may send a text message comprising an embedded object associated with the matched data to the at least one mobile node. At block 418, the processor 104 may, responsive to a receipt of selected discount coupon data from the least one mobile node, execute a redeem code associated with a selected discount coupon data keyword.

Figure 4B:
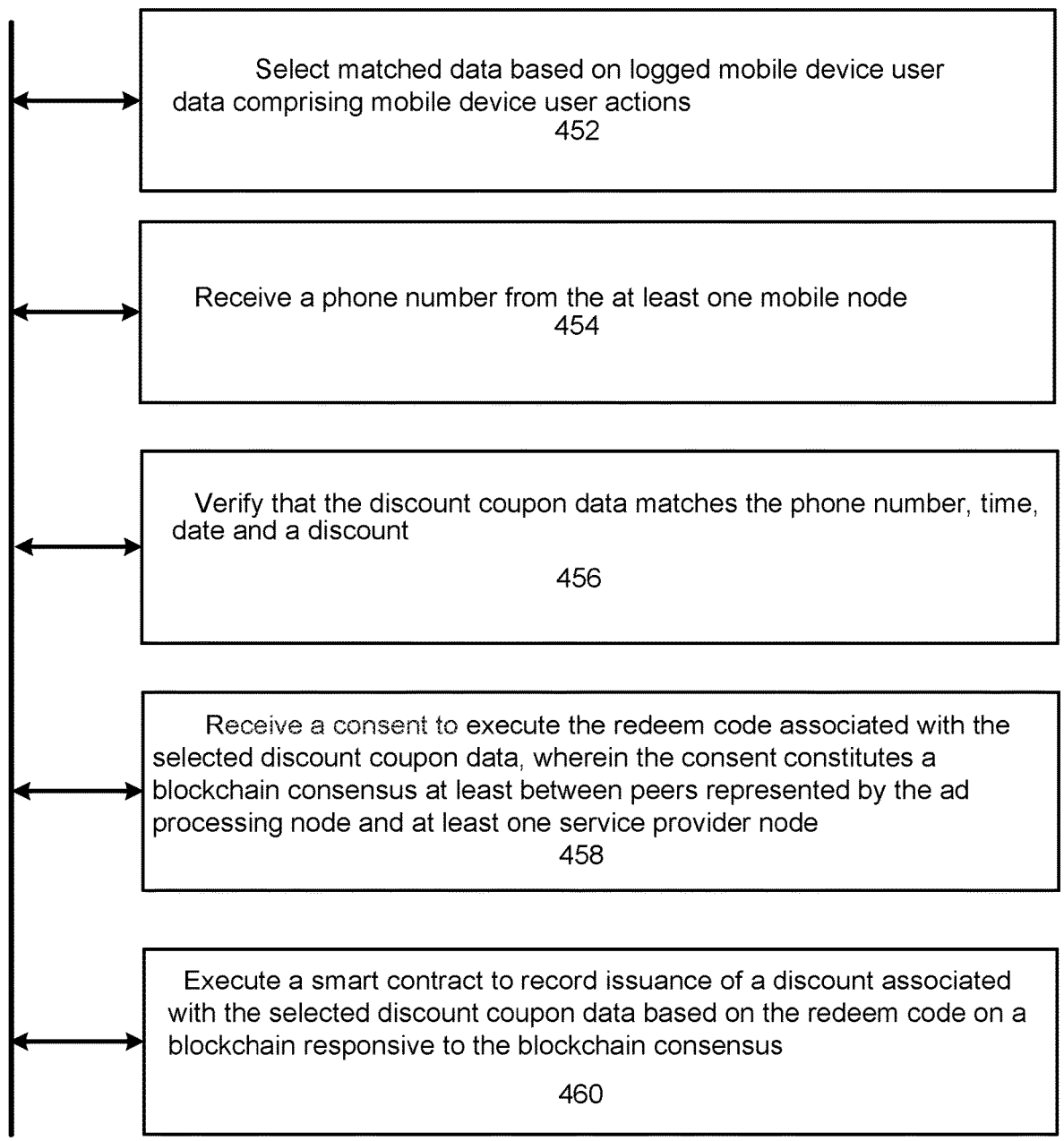
FIG. 4B illustrates a further flow diagram, according to example embodiments.

FIG. 4B illustrates a flow diagram 450 of an example method, according to example embodiments. Referring to FIG. 4B, the method 450 may also include one or more of the following steps. At block 452, the processor 104 may select matched data based on logged mobile device user data comprising mobile device user actions. At block 454, the processor 104 may receive a phone number from the at least one mobile node. At block 456, the processor 104 may verify that the discount coupon data matches the phone number, time, date and a discount. At block 458, the processor 104 may receive a consent execute the redeem code associated with the selected discount coupon data keyword, wherein the consent constitutes a blockchain consensus at least between peers represented by the ad processing node and at least one service provider node. At block 460, the processor 104 may execute a smart contract to record issuance of a discount associated with the selected discount coupon data based on the redeem code on a blockchain responsive to the blockchain consensus.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system/server node 500, which may represent or be integrated in any of the above-described components, etc.

Figure 5:
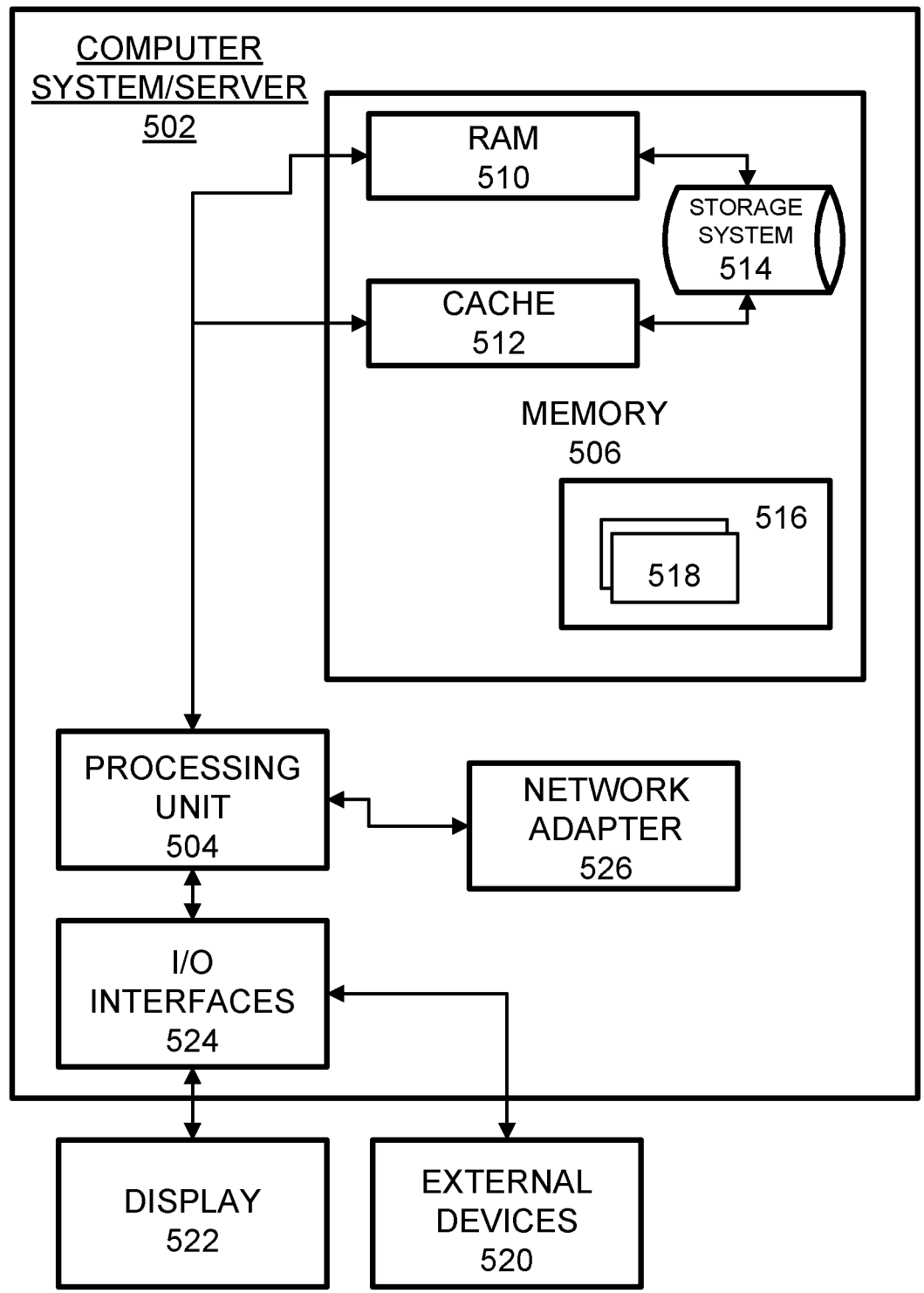
FIG. 5 illustrates an example server system that supports one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In the computing node 500 there is a computer system/server 502, which is operational with numerous other general purposes or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 502 may be used in cloud computing node 500 shown in the form of a general-purpose computing device. The components of the computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The exemplary computer system/server 502 typically includes a variety of computer system readable media. Such media may be any available media that is accessible by the computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. The computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

The computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, the computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, recipient or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a Smart phone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms, etc.) thereto.

What is claimed is:

1. A system, comprising:
   a processor of an ad processing node connected to a service provider node and to at least one mobile node over a network;
   a memory on which are stored machine-readable instructions that when executed by the processor, cause the processor to:
      receive a keyword defining a product-related category from the at least one mobile node;
      retrieve matched data comprising a list of items linked with discount coupons from a data source based on the product-related category;
      responsive to receiving data indicating a selection of a discount coupon from the at least one mobile node, send a text message comprising an embedded object associated with the discount coupon to the at least one mobile node; and
      responsive to receiving data indicating an activation of the embedded object at the at least one mobile node, execute a redeem code associated with the selected discount coupon.

2. The system of claim 1, wherein the embedded object is a URL referencing the matched data and corresponding discount coupons.

3. The system of claim 1, wherein the instructions further cause the processor to select matched data based on logged mobile device user data comprising mobile device user actions.

4. The system of claim 1, wherein the instructions further cause the processor to receive a phone number from the at least one mobile node.

5. The system of claim 4, wherein the instructions further cause the processor to verify that the discount coupon data matches the phone number, time, date and a discount.

6. The system of claim 1, wherein the instructions further cause the processor to receive a consent to execute the redeem code associated with the selected discount coupon data keyword, wherein the consent constitutes a blockchain consensus at least between peers represented by the ad processing node and at least one service provider node.

7. The system of claim 6, wherein the instructions further cause the processor to execute a smart contract to record issuance of a discount associated with the selected discount coupon data keyword based on the redeem code on a blockchain responsive to the blockchain consensus.

8. A method, comprising:
   receiving, by an ad processing server, a keyword defining a product-related category from the at least one mobile node;
   retrieving, by the ad processing server, matched data comprising a list of items linked with discount coupons from a data source based on the product-related category;
   responsive to receiving data indicating a selection of a discount coupon from the at least one mobile node, sending, by the ad processing server, a text message comprising an embedded object associated with the discount coupon to the at least one mobile node; and responsive to receiving data indicating an activation of the embedded object at the at least one mobile node, executing a redeem code associated with the selected discount coupon.

9. The method of claim 8, wherein the embedded object is a URL referencing the matched data and corresponding discount coupons.

10. The method of claim 8, further comprising selecting matched data based on logged mobile device user data comprising mobile device user actions.

11. The method of claim 8, further comprising receiving a phone number from the at least one mobile node.

12. The method of claim 11, further comprising verifying that the discount coupon data matches the phone number, time, date and a discount.

13. The method of claim 8, further comprising receiving a consent to execute the redeem code associated with the selected discount coupon data keyword, wherein the consent constitutes a blockchain consensus at least between peers represented by the ad processing node and at least one service provider node.

14. The method of claim 13, further comprising executing a smart contract to record issuance of a discount associated with the selected discount coupon data based on the redeem code on a blockchain responsive to the blockchain consensus.

15. A non-transitory computer-readable medium comprising instructions, that when read by a processor, cause the processor to perform:
receiving a keyword defining a product-related category from the at least one mobile node;
retrieving matched data comprising a list of items linked with discount coupons from a data source based on the product-related category;
responsive to receiving data indicating a selection of a discount coupon from the at least one mobile node, sending a text message comprising an embedded object associated with the discount coupon to the at least one mobile node; and
responsive to receiving data indicating an activation of the embedded object at the at least one mobile node, executing a redeem code associated with the selected discount coupon.

16. The non-transitory computer readable medium of claim 15, further comprising instructions, that when read by the processor, cause the processor to select matched data based on logged mobile device user data comprising mobile device user actions.

17. The non-transitory computer readable medium of claim 15, further comprising instructions, that when read by the processor, cause the processor to receive a phone number from the at least one mobile node.

18. The non-transitory computer readable medium of claim 17 further comprising instructions, that when read by the processor, cause the processor to verify that the discount coupon data matches the phone number, time, date and a discount.

19. The non-transitory computer readable medium of claim 15, further comprising instructions, that when read by the processor, cause the processor to receive a consent to execute the redeem code associated with the selected discount coupon data keyword, wherein the consent constitutes a blockchain consensus at least between peers represented by the ad processing node and at least one service provider node.

20. The non-transitory computer readable medium of claim 19, further comprising instructions, that when read by the processor, cause the processor to execute a smart contract to record issuance of a discount associated with the selected discount coupon data based on the redeem code on a blockchain responsive to the blockchain consensus.

21. The non-transitory computer readable medium of claim 15, further comprising instructions, that when read by the processor, cause the processor to convert the keyword into a product category, wherein the product category permanently assigns the keyword to a business.

22. The non-transitory computer readable medium of claim 21, further comprising instructions, that when read by the processor, cause the processor to permanently insert the keyword into searchable categories, wherein the categories allow content providers to display the keyword and corresponding discounts via an updateable object embedded into a text message URL link.

* * * * *